United States Patent Office 3,365,349
Patented Jan. 23, 1968

3,365,349
DETACHABLE BALL-SHAPED ULTRASONIC WELDING TIP
Henricus Petrus Cornelis Daniels, and Franciscus Maria Antonius Rademakers, Emmasingel, Eindhoven, Netherlands, assignors to North American Philips Company, Inc., New York, N.Y., a corporation of Delaware
Filed Mar. 31, 1964, Ser. No. 356,309
Claims priority, application Netherlands, Apr. 3, 1963, 291,094
6 Claims. (Cl. 156—580)

The invention relates to a method of welding plastic sheets together by means of ultrasonic vibrations and to a novel device suitable for carrying out the aforesaid method.

In known devices for the ultrasonic welding of metals, the welding tip is generally arranged to vibrate parallel to the metal surface. Sometimes the welding tip was shaped into a spherical form. In this case the welding tip was constructed to be integral with the ultrasonic vibrator. This method is not suitable for welding plastic sheets since irregular thick and thin parts ("blocking tendency") occur in the weld.

An object of the invention is to provide a method and a device by means of which plastic materials in the form of foils or fabrics can be welded in an extremely simple and cheap manner. It is particularly suitable for plastic materials, such as polypropylene, which can be welded thermally only with difficulty. This is of particular importance for several reasons, for example, on account of its higher mechanical strength, propylene is often preferred to polyethylene which can be welded both thermally and with the aid of the ultrasonic device in accordance with the invention. Nylon fabrics also can readily be welded to each other and to textile fabrics respectively. It has even proved to be possible to weld two textile fabrics to each other with a plastic sheet, in particular a nylon fabric, sandwiched between them.

The invention is characterized in that the sheets bear on an anvil the surface of which is substantially at right angles to the direction of movement of the ultrasonic vibrations. A welding tip is used which has the form of a ball clamped in a holder. This ball is made of hardened material, preferably of hardened steel having a polished surface. When use is made of a loose ball as the welding tip, this ball may be made of very hard material at low cost, while it can be replaced in case of damage. If the direction of vibration should be more or less parallel to the surface of the anvil, this ball would certainly be detached by virbration.

The invention will now be described more fully with reference to the accompanying drawing, in which.

Figure 1:
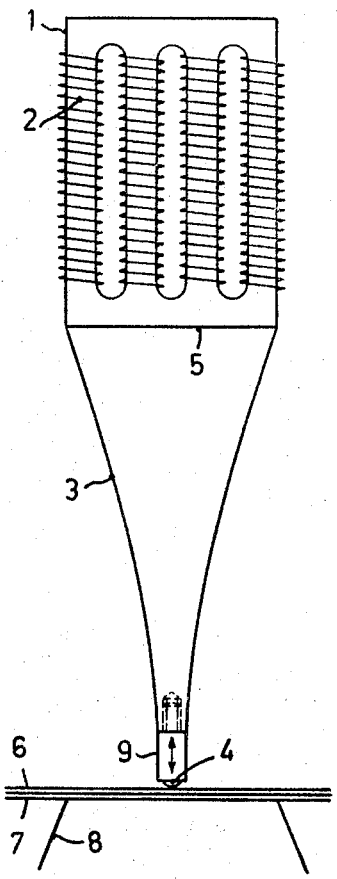
FIG. 1 shows an embodiment in accordance with the invention.

The device shown in FIG. 1 comprises a transducer 1 consisting of a core of magnetostrictive material around which windings 2 are arranged. With the aid of electrical energy supplied to the windings 2, the core of the transducer 1 is caused to perform ultrasonic mechanical vibrations. These vibrations are transmitted by means of an amplitude transformer 3 to a welding tip 4 which is consequently subjected to a vibration deviation exceeding that occurring at the radiating surface 5 of the transducer 1. The plastic sheets 6 and 7 to be welded lie on an anvil 8 and can be drawn over this anvil 8 and below the welding tip 4, so that a welding seam is produced. The length of the amplitude transformer 3 and the holder 9 of the welding tip 4, measured from the radiating surface 5 of the transducer 1 to the contact area with the sheets 6 and 7, is chosen to be equal to half a wave length of the ultrasonic vibrations of the transducer 1.

According to the invention, the ultrasonic device 1, 3, 9 is arranged so that the direction of vibration, indicated by the arrow in FIG. 1, is substantially at right angles to the anvil 8. A welding tip in the form of a ball of hardened material, preferably a ball of hardened steel having a polished surface, is further accommodated in the holder 9. This ball preferably has a diameter not exceeding 50 times the thickness of the foils to be welded to each other, as a result of which a narrow welding seam is obtained and the consumption of energy remains low. With a consumption of electrical energy of 60 w., a frequency of 20 kc./s. and a static pressure of the ultrasonic device 1, 3, 9 in the direction of the anvil 8 of 1,400 gms., it has been found possible to obtain a welding seam between two polypropylene foils having a thickness of, for example, 100 microns, by means of a ball-shaped welding tip 4 having a diameter of 2.3 mms. at a rate of 10 metres per minute. If, on the contrary, use was made of a ball having a diameter of 6 mms., the weld proved to be very inferior. As a result of the round shape of the welding tip, the sheets 6 and 7 can be readily moved in a direction parallel to the surface of the anvil 8. The polishing treatment considerably contributes to the formation of a welding seam of uniform thickness. If, unfortunately, the vibrating welding tip 4 should come directly in contact with the anvil 8, the risk of damage is not very great. Moreover, if the ball is damaged, it can readily be replaced, or an undamaged part of the surface can be faced to the sheets, respectively. Besides, the device in accordance with the invention provides in a simple manner the possibility of using at will balls of different diameters.

Figure 2:
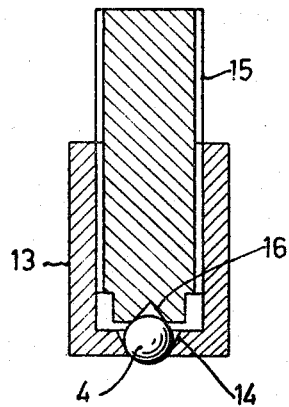
FIG. 2 shows on an enlarged scale the ball holder of FIG. 1.

FIG. 2 shows on an enlarged scale the welding tip holder 9 comprising the ball-shaped welding-tip 4. It consists of a round sleeve 13 having a conical bore 14 which is just too small to allow the ball to pass. With the aid of a cylindrical pressure member 15 which is screwed into the sleeve 13 and which is provided with a conical central recess 16, the ball 4 is clamped to the bore 14 and held in place. The assembly 9 is rigidly screwed into the amplitude transformer 3—the end of which is provided for this purpose with a bore 17 with screw-thread—so that it cannot be detached by the ultrasonic vibration. It is important to operate the device so that no tangential forces act on the ball 4 as a result of the chosen direction of vibration. In a practical embodiment, the sleeve 13 had an outer diameter of 6 mms., an inner diameter of 4 mms. The ball 4 was made of hardened steel and had a diameter of 2.3 mms., while both the sleeve 13 and the pressure member 15 were made of ordinary non-hardened steel.

In principle, it is also possible for the ball-shaped welding tip 4 to be accommodated in the anvil 8. It is generally not recommended, however, to bring the flat end of the amplitude transformer 3 directly into contact with the sheets 6 and 7, because as the sheets are moved along this end will bite into the sheets and damage them.

What is claimed is:
1. Apparatus for welding together two or more sheet-like members at least one of which includes a plastic material comprising, an anvil having a supporting surface for said members, an ultrasonic transducer having a welding tip confronting and spaced apart from said anvil surface to accommodate said members therebetween in close contact, means for causing said transducer to vibrate at right angles to said anvil supporting surface, said welding tip comprising a holder having a recess at one end thereof facing said anvil surface, a separate ball-shaped welding member accommodated in said recess and partially projecting therefrom, and means for clamping said ball-shaped member in said holder recess.

2. Apparatus as described in claim 1 wherein the surface of said ball-shaped member is composed of hardened steel polished to a smooth finish.

3. Apparatus as described in claim 1 wherein said clamping means comprises a sleeve threadably secured about said end of the holder, said sleeve having a conical bore in its end face in which the smallest diameter of the bore is smaller than the diameter of said ball-shaped member thereby to lock said ball-shaped member in place between the end faces of said holder and said sleeve with a portion of said ball-shaped member protruding through the bore in said sleeve.

4. Ultrasonic welding apparatus for fastening together two or more sheets of plastic material comprising, an anvil having a flat supporting surface for said plastic sheets, an ultrasonic transducer including an elongated cylindrical vibration-transmitting member extending at right angles to and confronting said anvil surface to accommodate said plastic sheets therebetween, said vibration-transmitting member having a conical recess in the end face thereof confronting said anvil surface, a collet threadably secured about said end of said vibration-transmitting member, said collet having a conical bore in its end face, a replaceable welding tip for said apparatus comprising a ball-shaped member tightly clamped between the end faces of said collet and said vibration-transmitting member in abutting contact with the wall defining said conical recess and the wall defining said conical bore so as to partially protrude through said conical bore to contact one of said plastic sheets, and means including said transducer for vibrating said vibration-transmitting member at right angles to said anvil supporting surface.

5. Apparatus as described in claim 4 wherein said plastic sheets have a given thickness dimension and wherein the diameter of said ball-shaped member does not exceed 50 times said given thickness dimension.

6. Apparatus as described in claim 5 wherein said ball-shaped member is composed of hardened steel.

References Cited

UNITED STATES PATENTS

| | | |
|---|---|---|
| 2,536,124 | 1/1951 | Bolvin et al. |
| 2,891,178 | 6/1959 | Elmore _____ 310—6 |
| 2,633,894 | 4/1953 | Carwile _____ 156—73 |
| 3,222,239 | 12/1965 | Deans _____ 156—73 |

FOREIGN PATENTS 650,521  10/1962  Canada.

EARL M. BERGERT, *Primary Examiner.*

DOUGLAS J. DRUMMOND, *Examiner.*